May 12, 1936.  J. M. BARRETT  2,040,591

VALVE

Filed Feb. 16, 1931

INVENTOR
Joseph M. Barrett
BY
ATTORNEY

Patented May 12, 1936

2,040,591

UNITED STATES PATENT OFFICE 2,040,591

VALVE

Joseph M. Barrett, Cleveland Heights, Ohio, assignor to Bailey Meter Company, a corporation of Delaware Application February 16, 1931, Serial No. 516,085

9 Claims. (Cl. 137—139)

This invention relates to valves, and particularly to regulating valves for throttling or controlling the flow of fluid therethrough. Such valves may be positioned to various degrees of opening by mechanical, fluid or other means, but it is with those valves positioned by fluid pressure means that my invention is particularly adapted.

A primary object of the invention is to provide means for forcing and holding such a valve in one extreme of its travel, should the normally acting fluid pressure fail.

Another object is to provide that the emergency forcing and holding means be fluid actuated, with fluid from a separate and more reliable source of supply.

With these and further objects in view, I will now describe an embodiment of my invention illustrated in the drawing.

Figure 1:
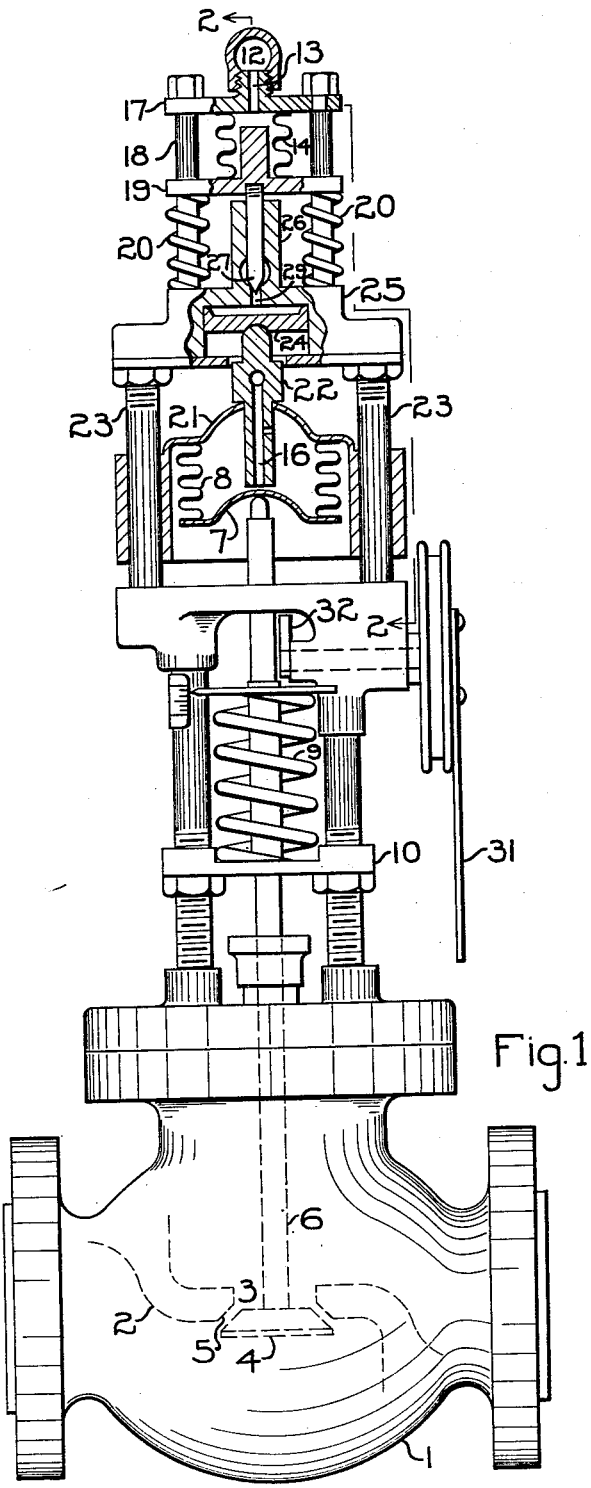
Fig. 1 is an elevation, partly in section and partly diagrammatic, of a fluid flow regulating valve embodying the invention.
Figure 2:
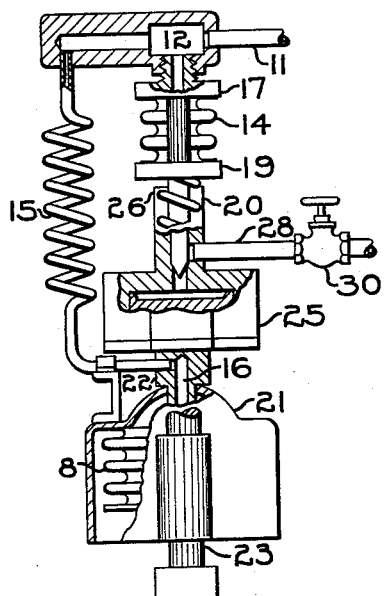
Fig. 2 is an elevation, partly in section, of a part of the assembly illustrated in Fig. 1, in the direction of the arrows along the line 2—2.

I have indicated at 1 a valve body or chambered casing having a dividing wall 2 through which is an opening 3 for the passage of fluid when a valve member 4 is positioned downwardly from seating contact with a seat 5 formed around the opening on the dividing wall. In Fig. 1 I have shown the dividing wall 2 as well as the valve member 4 and a part of a valve stem 6 diagrammatically in dotted lines as the particular construction thereof is immaterial to my invention and is not claimed herein.

The valve stem 6 extends externally of the casing 1 through suitable packing and at its uppermost end is in contact with the lower head 7 of an expansible metal bellows 8 within which is effective a controlling fluid under pressure. Opposing downward movement of the head 7 is shown a coiled spring 9 surrounding the valve stem 6, having its uppermost end fastened to the valve stem and its lowermost end resting upon a crossbar 10 rigidly supported from the casing 1.

A controlling fluid under pressure, which may be the fluid of the pipe in which the valve 1 is positioned, is led through the pipe 11 to a chamber 12 from which the pressure is effective through the channel 13 upon the interior of an expansible metal bellows 14, and through the pipe 15 and channel 16 upon the interior of the expansible metal bellows 8.

The casing of the chamber 12 is fixed to a cross member 17 in turn supported by the rods 18 forming a part of a structure rigidly fastened to and carried by the casing 1. The cross member 17 is enlarged between its points of joining the upright rods 18 to form a head for the bellows 14. A second and movable head to the bellows 14 is formed by a cross member 19 which is axially slidable upon the rods 18 and urged upwardly by the coiled springs 20 respectively surrounding the rods 18.

The bellows 8 has an upper head 21 to which is fastened a member 22 containing the channel 16 for the controlling fluid under pressure. The head 21 extends beyond the periphery of the bellows 8 and downwardly to shroud and protect the bellows, while projecting portions encircle two rods 23 for axial alignment and guidance when the head 21 is caused to move vertically. The head is restrained from upward movement by contact of the member 22 with a piston 24 limited in upward travel by the end of a cylinder formed in a cross member 25 positioned between the upright rods 18 and 23.

Carried by the head 19 is a needle valve 27, guided in an extension 26 of the cross member 25 and adapted when in its lowermost position to close passage between a pipe 28 and a channel 29, the latter communicating with the upper side of the piston 24. In the pipe 28 is shown a hand valve 30 for closing off flow therethrough of an auxiliary fluid under pressure available from a source considered more dependable than that supplying the controlling fluid under pressure to the pipe 11.

In operation, the controlling fluid under pressure available through the pipe 11, the pipe 15 and the channel 16 upon the interior of the bellows 8, causes the head 21 to be positioned upwardly to its extreme of travel where the member 22 forces the piston 24 against the uppermost end of the cylinder in which it cooperates. At the same time the pressure effective within the bellows 8 causes a downward positioning of the head 7 and of the valve stem 6 as opposed by the spring 9, to the end that the valve member 4 is positioned relative to the valve seat 5 proportional to the pressure of the controlling fluid effective within the bellows 8.

Simultaneously, the pressure of the controlling fluid through the channel 13 is effective upon the interior of the bellows 14. No upward motion of the head member 17 is possible, while downward motion of the head member 19 is opposed by the springs 20 and limited by contact of the pilot valve 27 seating to seal off the channel 29.

The springs 20 are of a strength only a small proportion of the normal or maximum pressure effective through the pipe 11, so that nearly a complete loss of pressure within the bellows 14 is necessary before the springs become effective to position the cross member 19 upwardly and unseat the pilot 27 from the channel 29. Normally the pilot 27 is held in sealing contact across the channel 29 and the effect of a variation in pressure of the controlling fluid in the pipe 11 is only upon the bellows 8 to position the valve member 4 relative to its seat 5 and thus control the flow of fluid through the casing 1.

The construction illustrated provides, however, emergency means for forcing the valve to wide open position wherein the valve member 4 is furthest from its seat 5 in case of a failure or decrease to a minimum value, of the pressure of the controlling fluid in the pipe 11. Assume that the valve member 4 is positioned a certain distance away from the seat 5 through the application to the interior of the bellows 8 of a certain pressure effective through the pipe 11, and that through inadvertence or accident the pipe 11 is cut or damaged so that such controlling fluid pressure falls to atmospheric, or very nearly so. Without the special features of my invention, the tendency would be for the valve member 4 to contact with the seat 5 and close off the flow of fluid through the casing 1, due to the failure of pressure within the bellows 8 and the preponderance of the upward force of the spring 9.

In the industrial or other services wherein my valve finds its greatest usefulness, it is in nearly all cases much more desirable to have the valve go to a wide open position in case of failure of a regulating part, rather than have it go to a closed position. If, for example, the valve is in a line or conduit through which water is being fed to a vapor-generating boiler, then it is far more serious to have the flow or feed of such water to the boiler shut off completely than it is to have the rate of flow increased to a maximum, as would be the case if the regulating valve were opened to its widest position. Therefore, while I have, broadly, a valve which tends to go to one extreme of its travel in case of certain failure, I specifically, as a preferred embodiment, illustrate and describe such a valve as going to an open extreme of travel rather than to a closed extreme of travel.

With the features illustrated and described, and with an auxiliary fluid under pressure available in the pipe 28 (the valve 30 being open) the valve member 4 will be positioned to its extreme travel away from the seat 5 to open to the greatest extent for flow through the casing 1.

Simultaneously with the failure of pressure within the bellows 8, the same condition exists within the bellows 14 and the preponderance of the springs 20 causes the cross member 19 to move upwardly, carrying the pilot valve 27 away from sealing position across the channel 29 and admitting the auxiliary fluid under pressure through the channel 29 from the pipe 28 to the upper side of the piston 24 to the end that the piston is forced downwardly, moving with it the member 22 until the lower end of this member engages the inner side of the head 7 of the bellows 8, and through the head 7 the upper end of the valve stem 6, to definitely force same downwardly to an extreme of travel wherein the piston 24 seats at its lowermost position in the cylinder wherein it moves.

I have shown the valve stem 6 seating at its upper end pivotally against the head 7 and not fastened thereto, so that I may by auxiliary means force to open position the valve member 4, entirely independent of the controlling fluid or the auxiliary fluid. I do this through a partial rotation of the handle 31 which causes a cam 32 to engage an extension of the valve stem 6 and overcome the upward force of the spring 9.

While I have illustrated and described a construction wherein a normal increase in controlling fluid pressure moves the valve stem downwardly to open or move the valve member 4 away from its seat 5, it will be seen that the construction might readily be such that a downward movement of the valve stem 6 would cause a positioning of the valve member 4 in closing relation to the seat 5, rather than in opening relation. Likewise other arrangements of the parts may be possible or desirable, but it is only necessary, to employ my invention, that the action of the emergency valve moving means be in a direction to force and hold the valve in an extreme position of its travel other than that to which a failure of the normal controlling means would tend to move it.

While I have illustrated and described certain preferred embodiments of my invention, it will be understood that I do not intend to be limited other than by what I claim in view of prior art.

What I claim as new and desire to secure by Letters Patent of the United States, is:

1. A valve of the class described, comprising in combination, a chambered casing having a dividing wall, an opening in said dividing wall, a seat formed around said opening, a valve stem extending within and without said casing and carrying a valve member capable of being positioned relative to said seat, normal controlling means and auxiliary means external of said casing and supported and guided from said casing for positioning said valve stem, said normal controlling means comprising an expansible metal bellows responsive to variations in pressure of a controlling fluid, means comprising a spring for opposing said normal controlling means, said auxiliary means comprising a piston cooperating in a cylinder and capable of positioning said valve stem in one direction only and responsive to pressure of an auxiliary fluid, means for making available said auxiliary fluid upon said piston comprising a pilot valve positioned in a conduit having auxiliary fluid under pressure, a second bellows normally holding said pilot valve in shutoff position by the application within said bellows of said controlling fluid over a predetermined pressure, and adapted upon failure of said controlling fluid below said predetermined pressure to release said pilot from said shutoff position to make effective said auxiliary fluid under pressure upon said piston, and a valve in said conduit for making available said auxiliary fluid at said pilot valve.

2. A regulating valve for controlling fluid flow adapted to be positioned responsive to variations in a controlling fluid pressure, and means actuated by an auxiliary fluid pressure having a separate source from said controlling fluid pressure for forcing said valve to an extreme position of its travel responsive at a predetermined value of said controlling fluid pressure, said fluid actuated means being mechanically connected to said valve.

3. A regulating valve for controlling fluid flow adapted to be positioned responsive to variations in a controlling fluid pressure, and means actuated by a second fluid pressure and responsive to a predetermined value of said controlling fluid pressure for forcing and holding said valve in an extreme position of its travel.

4. A regulating valve for controlling fluid flow comprising a valve body and a valve member, a fluid pressure actuated abutment and a cooperating counter-balancing means for normally positioning said valve member, and means responsive to a predetermined value of the fluid pressure for positioning said valve member to an extreme position of its travel.

5. In combination, a movable valve member, an expansible contractible chamber sensitive to a first fluid pressure for positioning said valve member, a movable abutment sensitive to a second fluid pressure for positioning said valve member, a disengageable mechanical connection between said movable abutment and said valve member, and valve means under the control of the first fluid pressure for making effective the second fluid pressure on said movable abutment for positioning said movable valve member.

6. In combination, a movable valve member, a contractile chamber adapted to be expanded and contracted by a first fluid pressure for positioning said valve member, an abutment movable by a second fluid pressure, means actuated by said movable abutment for bodily moving said contractile chamber for producing a positioning of said valve member, and valve means under the control of said first fluid pressure for controlling the application of said second fluid pressure on said movable abutment.

7. In combination, a movable valve member, a contractile chamber adapted to be expanded and contracted by a first fluid pressure for positioning said valve member, a second contractile chamber adapted to be expanded and contracted by said first fluid pressure, a movable abutment movable by a second fluid pressure, valve means operated by said second contractile chamber for controlling the application of said second fluid pressure on said movable abutment, and a push rod actuated by said movable abutment for bodily moving said first contractile chamber to position said valve member.

8. A regulating valve for controlling fluid flow adapted to be positioned responsive to variations in a controlling fluid pressure, means actuated by a second fluid pressure for forcing and holding said valve in an extreme position of its travel, and means sensitive to said controlling fluid pressure for making effective said second fluid pressure at a predetermined value of the controlling fluid pressure.

9. In combination, a movable valve member, means responsive to variations in a controlling fluid pressure for normally positioning said valve member, means actuated by a second fluid pressure for also positioning said valve, a disengageable mechanical connection between said valve member and said second named means, and means sensitive to said controlling fluid pressure for making effective the second fluid pressure on said second named means at a predetermined value of the controlling fluid pressure.

JOSEPH M. BARRETT.